ated Dec. 5, 1967

3,356,680
AMINOALKYL-DIBENZO-[b,f] THIEPINS
AND INTERMEDIATES
Walter Schindler, Riehen, and Hans Blattner, Basel, Switzerland, assignors to Geigy Chemical Corporation, Greenburgh, N.Y., a corporation of Delaware
No Drawing. Filed Apr. 27, 1964, Ser. No. 362,970
Claims priority, application Switzerland, May 4, 1963, 5,649/63
19 Claims. (Cl. 260—268)

ABSTRACT OF THE DISCLOSURE

The compounds are of the class of 10-aminomethyl-dibenzothiepins which are useful as depressant agents and of the class of 10-halomethyl-dibenzothiepins which are useful as starting materials for the above 10-amino-methyl-dibenzothiepins. Illustrative species are 10-dimethylamino-methyl-dibenzo[b,f]thiepin and 10-bromomethyl-dibenzo[b,f]thiepin.

---

The present invention concerns new thiepin derivatives which have valuable pharmacological properties, as well as a process for the production thereof, and the use of such new derivatives as calmative agent.

The novel thiepins according to the invention are represented by the general formula

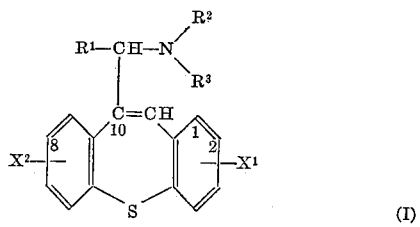

(I)

wherein each of $X^1$ and $X^2$, independently of the other, represents hydrogen, chlorine, bromine, lower alkyl, lower alkoxy or lower alklythio, especially methyl, methoxy or methylthio,
$R^1$ represents hydrogen or the methyl radical,
$R^2$ represents hydrogen or lower alkyl, and
$R^3$ represents hydrogen or lower alkyl, or
$R^2$ and $R^3$ taken together with the nitrogen atom to which they are linked and with the optional inclusion of divalent oxygen, the imino group or of a lower alkylimino, hydroxy-lower alkylimino or alkanoyloxy-alkylimino group as ring member, form a saturated heterocyclic ring, with 5–7 ring-members, namely pyrrolidinyl, piperidinyl, hexahydroazepinyl, morpholinyl, piperazinyl and homopiperazinyl, N-hydroxy-lower alkyl, preferably of from 2 to 4 carbon atoms, and N-alkanoyloxy-lower alkyl derivatives of piperazinyl and homopiperazinyl: the alkanoyloxy moiety in the last mentioned substitiuent having not more than 18 carbon atoms, and the alkyl moiety preferably from 2 to 4 carbon atoms.

These new compounds of Formula I and their pharmaceutically acceptable salts with inorganic and organic acids have more particular adrenolytic activity and act as depressants on the central nervous system as indicated by their sedative and anesthesia-potentiating activities.

They can be administered orally or parenterally in the form of aqueous solutions of their pharmaceutically acceptable salts. If desired, they can be combined with other pharmaceuticals, for example, with known anti-depressives.

In the preferred, most readily producible compounds falling under Formula I, $R^1$ is hydrogen or methyl, $X^1$ is hydrogen, chlorine, bromine, preferably in the 2- or 3-position, and $X^2$ is hydrogen, chlorine, bromine, preferably in the 7- or 8-position. Also $X^1$ and $X^2$ can be, as next preferred substituents, methyl or methoxy in the 2- or 3-, and/or in the 7- or 8-position respectively;

represents preferably amino, mono-lower alkylamino, di-lower alkylamino, pyrrolidino, piperidino, 4-methyl-piperazinyl - (1), 4-(β-hydroxy-ethyl)-piperazinyl-(1), 4-(β-acetoxy-ethyl)-piperazinyl-(1) or 4-(β-pivalyloxy-ethyl)-piperazinyl-(1); i.e., $R^2$ and $R^3$ are hydrogen, methyl, ethyl, n- or iso-propyl, or n-, sec- or tert-butyl radicals, and when $R^2$ and $R^3$ are bound together directly or with the inclusion of optional hetero atoms they form, together with the nitrogen atom to which they are linked, the last-mentioned hetero rings, or, as next preferred examples, a hexahydroazepinyl, morpholino, of the homo-piperazinyl, 4-methyl-1-homo-piperazinyl, 4-(β-hydroxyethyl) - 1 homo-piperazinyl, 4-(β-acetoxyethyl)-1-homo-piperazinyl, or 4-(β-pivalyloxyethyl)-1-homo-piperazinyl radicals.

More particularly, the compounds falling under Formula I which are represented by the formula

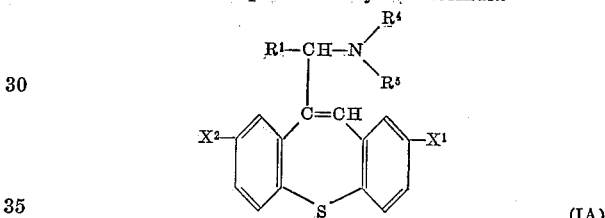

(IA)

and wherein
$R^1$ has the meaning given above,
$R^4$ represents hydrogen or lower alkyl, preferably methyl,
$R^5$ represents lower alkyl, preferably methyl, or $R^4$ and $R^5$ taken together with the nitrogen atom to which they are attached represent a piperazinyl or N-lower-alkyl, especially N-methyl, piperazinyl radical, and one of $X^1$ and $X^2$ represents hydrogen, chlorine, bromine or lower-alkyl, especially methyl, are distinguished by a significant adrenolytic component in their pharmacodynamic spectra.

In contrast to known 10-amino-alkyl-dibenzo-thiepins which act as stimulants on the central nervous system, the compounds falling under Formula I act as depressants thereon, they possess a pronounced anesthesia-potentiating activity in test animals and induce sleep in man. Their pharmacodynamic spectra also contain serotonin-antagonistic and antihistaminic components.

In addition, the compounds according to the invention, especially those of Formula IA, possess antitremorine activity, and can, therefore, be used as anti-Parkinson agents.

The compounds falling under Formula I are produced by a novel process according to the invention described in detail hereinafter which is clearly distinct from the processes hitherto described for the production of known 10-aminoalkyl-substituted dibenzo[b,f]thiepins.

The novel process comprises
(a) Alkylating a compound of the general formula

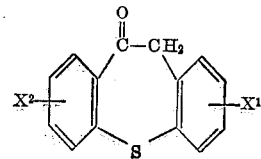

(II)

wherein $X^1$ and $X^2$ have the meanings given above, for instance the known dibenzo[b,f]thiepin-10-(11H)-one described by Mirwald, thesis published at the University of Saarbrücken, Germany, 1961, in the 11-position, e.g. by means of methyl or ethyl iodide, in a suitable inert solvent such as toluene, in the presence of a basic condensing agent such as, e.g. sodium amide, (b) Reducing the 10-position of the resulting compounds, e.g. by means of lithium aluminum hydride in ether, (c) Converting the 10-hydroxy compounds obtained to the corresponding 10-chloro compounds, e.g. by treatment with thionyl chloride in the presence of an agent binding hydrogen chloride such as pyridine and in an inert solvent such as benzene, (d) Splitting off hydrogen chloride by means of potassium tert.butyloxide in an inert solvent such as toluene, thereby obtaining the corresponding 10-alkyl-dibenzo[b,f]thiepin;

(e) Converting the latter to a reactive ester thereof, for instance by brominating the alkyl radical in the 10-position with N-bromosuccinimide or other brominating agents in an inert solvent, such as e.g. carbon tetrachloride, or by chlorinating the said alkyl radical with N-chlorosuccinimide; and (f) Reacting the reactive ester of the formula

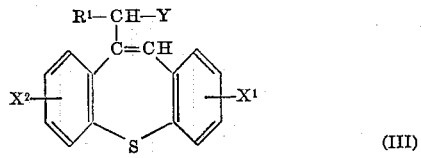

(III)

wherein $R^1$, $X^1$ and $X^2$ have the meanings given above and Y represents a reactive acid radical, especially the bromo radical, with an amine of the formula

(IV)

wherein $R^2$ and $R^3$ have the meanings given above, thereby obtaining the correspondingly substituted compound of Formula I;

Or with a metal compound of an N-acyl derivative of a lower alkylamine, and if necessary, hydrolyzing the reaction product to split off the acyl radical which may be bound to an N-atom of the side chain;

If desired, treating a compound of Formula I obtained as described above and containing the imino group as ring member, with a lower alkylene oxide, a reactive monoester of a lower alkane diol or with a reactive ester of a lower alkanoyloxy alkanol;

If desired, acylating a compound of Formula I containing a lower hydroxyalkylimino group as ring member into one containing a lower alkanoyloxyalkylimino group and, If desired, converting a compound of Formula I into a salt with an inorganic or organic acid.

Reactive esters of Formula III are, for instance, halogenides, especially bromides. Further derivatives of compounds according to the invention are, for example, sulfonic acid esters such as p-toluene sulfonates or methane sulfonates. In addition, a compound of Formula I containing lower alkyl radicals as $R^2$ and $R^3$, or containing a lower alkylimino radical as optional ring member of the heterocyclic radical formed by $R^2$, $R^3$ and the nitrogen atom to which they are linked, can be converted, if desired, to one containing a lower alkyl radical $R^2$ and a hydrogen atom $R^3$, and vice versa, or into one having the imino group as optional ring member, by reacting the former with an organic acid halide or anhydride such as chloroformic acid ester or with a carboxylic acid halide such as acetyl bromide or benzoyl chloride, or with phosgene, and hydrolyzing the compound obtained in which $R^2$ or $R^3$ represent an acyl radical, e.g. an alkoxycarbonyl radical, the acetyl radical or benzoyl radical, or the chlorocarbonyl radical, or in which an acylimino group represents the optional ring member.

Reactions of reactive esters of Formula III with amines of Formula IV are performed, for example, in inert solvents such as benzene, lower alkanols or alkanones, or in water, whereby an excess of amine can serve as acid-binding agent and, optionally used in excess, also as sole reaction medium. The reaction is more or less exothermic depending on the meanings of $R^1$, $R^2$ and $R^3$, and may be completed by heating the reaction mixture if necessary. The reactive esters of Formula III can be reacted, for example, with dimethylamine, methylethylamine, diethylamine, di-n-propylamine, ammonia, methylamine, ethylamine, diethanolamine, n-propylamine, isopropylamine, n-butylamine, isobutylamine, pyrrolidine, piperidine, hexamethylenimine, morpholine, 1-methyl-piperazine, 1-(β-hydroxyethyl)-piperazine, 1-(β-acetoxyethyl)-piperazine, 1-(β-pivaloyloxyethyl)-piperazine or 1-methyl-homopiperazine.

The reaction of a reactive ester of Formula III with a metal compound of an N-acyl derivative of a lower alkylamine, e.g. with the sodium derivative of an N-formyl or N-alkoxycarbonyl-lower alkylamine is performed, for example, by heating in an inert organic solvent such as benzene or toluene under anhydrous conditions. The acyl radical bound to the nitrogen atom of the side chain in the reaction product is split off, for example, by treating the reaction product with an alkali metal hydroxide at a raised temperaturer either in a higher boiling organic solvent containing hydroxyl groups such as ethylene glycol or diethylene glycol or in one of their mono-lower alkyl ethers, or in a lower alkanol. In the latter case, the reaction is preferably performed in a closed vessel. Furthermore, the hydrolysis can be performed, e.g. by boiling with alkanolic hydrochloric acid.

In compounds of Formula I in which $R^2$ and $R^3$ together with the nitrogen atom to which which they are linked and an imino group form a heterocyclic ring, such heterocyclic ring is preferably the 1-piperazinyl or 1-homopiperazinyl moiety. In order to introduce a lower hydroxyalkyl or alkanolyloxy-alkyl substituent as defined hereinbefore on the nitrogen atom of the free imino group, for example into the 4-position of the piperazine or homopiperazine ring, such compounds are reacted for example with β-bromoethanol, β-(p-toluene sulfonyloxy)-ethanol, or β-bromoethyl acetate, in the presence of a suitable acid-binding agent, such as potassium carbonate or sodium carbonate, for instance, in an organic solvent such as benzene, toluene, acetone or butanone, or alternatively such compounds are treated with ethylene oxide or propylene oxide in an inert organic solvent.

The acylation of 10-[4'-hydroxyalkyl-piperazinyl-(1)-methyl]-dibenzo[b,f]thiepins or of 10-[α-{4'-hydroxyalkyl-piperazinyl-(1')}-ethyl]-dibenzo[b,f]thiepins, or of the corresponding homopiperazinyl compounds, is performed, e.g. by heating these substances in the anhydride of an alkanoic acid such as acetic acid, propionic acid, butyric acid or pivalic acid, or by treating them with the corresponding acid halides in the presence of a tertiary nitrogen base such as pyridine or its homologues or by reacting their corresponding sodio derivatives with an acid chloride.

Compounds of Formula I containing a lower alkyl radical $R^2$ or $R^3$ or a lower alkylimino group as ring members are converted to compounds containing a hydrogen atom as $R^2$ or $R^3$ or the free imino group as ring member, by reacting them at room temperature or at an elevated temperature in the presence or absence of a suitable organic solvent such as, e.g. benzene, toluene, diethyl ether, diisopropyl ether or tetrahydrofuran, with organic acid halides, e.g. with methyl or ethyl chloroformate, benzoyl chloride, acetyl bromide or cyanogen bromide, or with anhydrides, particularly acetic anhydride, or with phosgene.

The acid halides of anhydrides can be used in an equimolar amount or, particularly if there is only a single nitrogen atom in the side chain of the said compounds of Formula I, the said halides or anhydrides can be used in a considerable excess and in this case they can serve as sole reaction medium. On bringing the reaction components together, exothermic reaction may occur. A lower alkyl halide is liberated in the course of the reaction. The N-acyl compounds formed are hydrolyzed, for example, under the reaction conditions given above for the splitting off of an N-acyl radical in the above-mentioned side chain or "tail."

The new compounds of Formula I form salts, most of which are water soluble, with inorganic and organic acids such as hydrochloric acid, hydrobromic acid, sulfuric acid, phosphoric acid, methane sulfonic acid, ethane disulfonic acid, β-hydroxyethane sulfonic acid, acetic acid, lactic acid, oxalic acid, succinic acid, fumaric acid, maleic acid, malic acid, tartaric acid, citric acid, benzoic acid, salicyclic acid, phenylacetic acid and mandelic acid.

Such salts, and among them especially the above-listed ones which are pharmaceutically acceptable, especially those which are water-soluble, have the utilities described hereinbefore.

The following non-limitative examples further illustrate the invention. In these examples, the temperatures are given in degrees centigrade; "g" stands for "gram," "ml" for "milliliter," and "abs." for "absolute" (anhydrous).

EXAMPLE 1

(a) A suspension of 4.3 g. of sodium amide in 12.6 ml. of abs. toluene is added dropwise at 50–60° and within 15 minutes to a solution of 22.6 g. of dibenzo[b,f]thiepin-10(11H)-one (M.P. 68°) in 220 ml. of abs. benzene and the reaction mixture is then refluxed for 2 hours. It is then cooled to 45° and 20 g. of methyl iodide are added whereby the reaction temperature is kept between 40 and 45°. The reaction mixture is then stirred for 20 hours at this temperature whereupon another 5 g. of methyl iodide are added. Stirring is continued at 40–45° until the solution has a neutral reaction, which takes 24 to 36 hours. After cooling the reaction mixture, water is added, the organic phase is removed, washed with water and dried over sodium sulfate. The solvent is then evaporated and the residue is distilled under high vacuum whereupon 11-methyl-dibenzo-[b,f]thiepin-10(11H)-one is obtained. B.P.$_{0.002}$:148–150° (M.P. 62–64°).

(b) A solution of 20 g. of 11-methyl-dibenzo[b,f]thiepin-10(11H)-one in 50 ml. of abs. ether is added dropwise within 1 hour to a suspension of 2.4 g. of lithium aluminum hydride in 75 ml. of abs. ether. The reaction mixture is then refluxed for 6 hours. After cooling, water is carefully added, the organic phase is removed, washed with water, dried over sodium sulfate and the solvent is evaporated. On distilling the residue under high vacuum, 11-methyl-10,11-dihydro-dibenzo[b,f]thiepin-10-ol is obtained, B.P.$_{0.05}$:142–144°.

(c) A solution of 5.1 ml. of thionyl chloride in 70 ml. of abs. benzene is added dropwise while stirring vigorously to a solution of 16.5 g. of 11-methyl-10,11-dihydro-dibenzo[b,f]thiepin-10-ol in 180 ml. of abs. benzene and 19 ml. of abs. pyridine, the addition being made within half an hour; the reaction temperature rises to 30°. The reaction mixture is then stirred for 4 hours at a temperature of 40–50°, cooled and the reaction solution is decanted from the precipitated pyridine hydrochloride. It is washed twice with dilute sulfuric acid and then with water, dried over sodium sulfate, the solvent is evaporated and the residue is distilled under high vacuum. 10-chloro-11-methyl-10,11-dihydro-dibenzo[b,f]thiepin (mixture of cis and trans forms) is obtained, B.P.$_{0.05}$:140°. If ether is added to the distillate the pure trans isomer is obtained which melts at 118–119°.

(d) 9 g. of 10-chloro-11-methyl-10,11-dihydro-dibenzo[b,f]thiepin are dissolved in a solution of 4.7 g. of potassium tert-butylate in 100 ml. of abs. toluene and the whole is refluxed for 16 hours. After cooling, the organic phase is well washed with water, dried over sodium sulfate and the solvent is evaporated. The residue is distilled under high vacuum whereupon 10-methyl-dibenzo[b,f]thiepin passes over at 114° under a pressure of 0.001 torr (M.P. 51–52°).

(e) 6.1 g. of 10-methyl-dibenzo[b,f]thiepin are dissolved in 60 ml. of carbon tetrachloride and 5 g. of N-bromo-succinimide are added to the solution. The reaction mixture is brought to the boil while stirring and is strongly irradiated with two 200-watt lamps or an ultraviolet lamp.

It is kept at the boil until all the succinimide is on the surface of the solution, which takes about 2 hours.

It is then cooled and the succinimide is filtered off under suction, the organic phase is washed with water, dried over sodium sulfate and completely evaporated in a rotary evaporator. The oily 10-bromomethyl-dibenzo[b,f]thiepin which remains as crude product is further worked up. The pure compound melts at 83–85°.

(f) The crude 10-bromomethyl-dibenzo[b,f]thiepin obtained under (e) is dissolved in 25 ml. of abs. benzene and the solution is added to a solution of 5 g. of dimethylamine in 50 ml. of abs. benzene. The reaction mixture is kept for 1 hour at 50–60°. The organic phase is then thoroughly washed with water, dried over anhydrous potassium carbonate and the solvent is evaporated. Petroleum ether is added to the residue whereupon 10-dimethylaminomethyl-dibenzo[b,f]thiepin crystallizes out. After recrystallizing from petroleum ether, the substance has a melting point of 114–116°. 10-(1'-pyrrolidinyl-methyl)-dibenzo[b,f]thiepin, for example, is obtained in an analogous manner as an oil from which 10-(1'-pyrrolidinyl-methyl)-dibenzo[b,f]thiepin hydrochloride can be prepared with ethanolic hydrochloric acid. The latter, after recrystallization from abs. ethanol, melts at 37°.

(g) Analogously to Example 1 (f), on using monomethylamine instead of dimethylamine, 10-monomethylaminomethyl-dibenzo[b,f]thiepin is obtained from crude 10-bromomethyl-dibenzo[b,f]thiepin. Its hydrochloride melts at 234–237°. On using diethylamine instead of dimethylamine, 10-diethylaminomethyl-dibenzo[b,f]thiepin and on using monoethylamine instead of dimethylamine, 10-monoethylaminomethyl-dibenzo[b,f]thiepin is obtained in the same manner.

In an analogous manner the following compounds are obtained on using the corresponding bases:

(h) 10 - [(4' - β - hydroxyethyl - 1' - piperazinyl)-methyl]-dibenzo[b,f]thiepin, M.P. of the dihydrochloride 235–242°;

(i) 10 - [(4' - β - pivaloyloxyethyl - 1' - piperazinyl)-methyl]-dibenzo[b,f]thiepin, M.P. of the dihydrochloride 199–200°;

(k) 10 - [(4' - methyl - 1' - piperazinyl) - methyl]-dibenzo[b,f]thiepin, M.P. of the dihydrochloride 225–228°;

(l) 10-aminomethyl-dibenzo[b,f]thiepin of which the hydrochloride, containing water of crystallization, melts at 228–231°;

(m) 10 - [(4' - β - acetoxyethyl - 1' - piperazinyl)-methyl]dibenzo[b,f]thiepin;

(n) 10 - [(4' - β - lauroxyethyl - 1' - piperazinyl)-methyl]-dibenzo[b,f]thiepin;

(o) 10 - [(4' - β - palmitoxyethyl - 1' - piperazinyl)-methyl]-dibenzo[b,f]thiepin;

(p) 10-piperazinyl-methyl-dibenzo[b,f]thiepin;

(q) 10-homopiperazinyl-methyl-dibenzo[b,f]thiepin.

EXAMPLE 2

2 - chloro - dibenzo[b,f]thiepin - 10(11H) - one (M.P. 141°) is produced analogously to dibenzo[b,f]thiepin-10-

(11H)-one. From the former substance, the end products (a) 2 - chloro - 11 - dimethyl - aminomethyl - dibenzo[b,f]thiepin (M.P. 116°, recrystallized from petroleum ether) and
(b) 2 - chloro - 11 - (4' - methyl - 1' - piperazinyl - methyl)-dibenzo[b,f]thiepin (M.P. 111–112° recrystallized from petroleum ether)

are produced by way of the intermediate products, 2-chloro - 11 - methyl - dibenzo[b,f]thiepin - 10 - (11H)-one (M.P. 125–128° recrystallized from ethanol), 2-chloro - 11 - methyl - 10,11 - dihydro - dibenzo[b,f] thiepin-10-ol (crude product), 2,10-dichloro-11-methyl-10,11-dihydro-dibenzo[b,f]thiepin (crude product), 2-chloro-11-methyl-dibenzo[b,f]thiepin (M.P. 78° recrystallized from pentane), 2-chloro-11-bromomethyl-dibenzo[b,f]thiepin (M.P. 114° recrystallized from ether/petroleum ether).

In an analogous manner there are produced: 2-bromo-11 - dimethylamino - methyl - dibenzo[b,f]thiepin; 2-bromo - 11 - monomethylamino - methyl - dibenzo[b,f]thiepin.

EXAMPLE 3

8-chloro-dibenzo[b,f]thiepin-10(11H)-one is produced analogously to dibenzo[b,f]thiepin-10(11H)-one. Recrystallized from ether, the former melts at 119–120°. From it, for example the end products (a) 2 - chloro - 10 - dimethylaminomethyl - dibenzo[b,f]thiepin (M.P. 76–77° recrystallized from petroleum ether) and
(b) 2 - chloro - 10 - piperidino - methyl - dibenzo[b,f]thiepin (M.P. 118° recrystallized from benzine) are obtained by way of 8-chloro-11-methyl-dibenzo[b,f]thiepin-10(11H)-one (M.P. 113° recrystallized from ethanol), 8 - chloro - 11 - methyl - 10,11 - dihydro - dibenzo[b,f]thiepin-10-ol (crude product), 2,11-dichloro-10-methyl-10,11-dihydro-dibenzo[b,f]thiepin (crude product), 2-chloro - 10 - methyl - dibenzo[b,f]thiepin (M.P. 68° recrystallized from pentane), 2 - chloro - 10 - bromomethyl-dibenzo[b,f]thiepin (M.P. 111–112° recrystallized from benzine).

EXAMPLE 4

2 - methoxy - dibenzo[b,f]thiepin - 10(11H) - one (M.P. 131.5°) is produced analogously to dibenzo[b,f]thiepin-10(11H)-one. From it, for example, the end product 2 - methoxy - 11 - dimethylamino - methyl - dibenzo[b,f]thiepin, B.P. 151°/0.01 torr, M.P. 92.5°, is obtained by way of the intermediate products 2-methoxy-11 - methyl - dibenzo[b,f]thiepin-10(11H)-one, B.P. 166–169°/0.02 torr, 2-methoxy-11-methyl-10,11-dihydro-dibenzo[b,f]thiepin-10-ol, M.P. 167.5°, 2-methoxy-10-chloro - 11 - methyl - 10,11 - dihydro - dibenzo[b,f]thiepin, M.P. 80°, 2 - methoxy - 11 - methyl - dibenzo[b,f]thiepin, B.P. 153–155°/0.01 torr, 2-methoxy-11-bromomethyl-dibenzo[b,f]thiepin (crude product). The hydrochloride of this end product melts at 230–231° (partial decomposition).

In an analogous way, by starting from 2-methylthio-dibenzo[b,f]thiepin-10(11H)-one, the end products 2-methylthio - 11 - dimethylaminomethyl - dibenzo[b,f]thiepin and 2-methylthio-11-monomethylaminomethyl-dibenzo[b,f]thiepin can be obtained.

EXAMPLE 5

8 - methyl - dibenzo[b,f]thiepin - 10(11H) - one (M.P. 65–68° from ethanol) is produced analogously to dibenzo[b,f]thiepin-10(11H)-one. From it, for example, the end product 2-methyl-10-dimethylaminomethyl-dibenzo[b,f]thiepin, M.P. 245–248°, is obtained by way of the intermediate products 8,11-dimethyl-dibenzo[b,f]thiepin-10-(11H)-one, B.P. 148–151°/0.06 torr, 8,11-dimethyl - 10,11 - dihydro - dibenzo[b,f]thiepin - 10 - ol (crude product, 2,10 - dimethyl - 11 - chloro - 10,11 - dihydro-dibenzo[b,f]thiepin, B.P. 138–141°/0.05, 2,10-dimethyl-dibenzo[b,f]thiepin, B.P. 125–128°/0.01 torr, and 2 - methyl - 10 - bromomethyl - dibenzo[b,f]thiepin (crude product).

EXAMPLE 6

3 - chloro - dibenzo[b,f]thiepin - 10(11H) - one (M.P. 143°) is produced analogously to dibenzo[b,f]thiepin-10-(11H)-one. From it, for example, the end products (a) 3 - chloro - 11 - dimethylaminomethyl - dibenzo[b,f]thiepin, M.P. 70°, as well as
(b) 3 - chloro - 11 - (1' - pyrrolidinylmethyl) - dibenzo[b,f]thiepin, B.P. 172–175°/0.001 torr, hydrochloride M.P. 265–268° (decomposition), are obtained by way of the intermediate products 3-chloro-11-methyl-dibenzo[b,f]thiepin-10(11H)-one, M.P. 94°, 3-chloro-11-methyl-10,11-dihydro-dibenzo[b,f]-thiepin-10-ol (crude product), 3,10 - dichloro - 11 - methyl - 10,11 - dihydro - dibenzo[b,f]thiepin, (crude product), 3-chloro-11-methyl-dibenzo[b,f]thiepin, B.P. 140°/0.001 torr, and 3-chloro-11-bromomethyl-dibenzo[b,f]thiepin, M.P. 118°. In an analogous way the compounds (c) 3 - chloro - 11 - morpholinomethyl - dibenzo[b,f]thiepin and
(d) 3 - chloro - 11 - (1' - hexahydroazepinomethyl)-dibenzo[b,f]thiepin can be obtained.

EXAMPLE 7

If, analogously to Example 1(a), the equimolar amount of ethyl iodide is used instead of methyl iodide, 11-ethyl-dibenzo[b,f]thiepin-10(11H)-one, B.P. 152–154°/0.005 torr is obtained. From it, for example, the following end products are produced:

(a) 10 - ($\alpha$ - dimethylaminoethyl) - dibenzo[b,f]thiepin, B.P. 160°/0.012 torr, as well as
(b) 10 - ($\alpha$ - monomethylaminoethyl) - dibenzo[b,f]thiepin, the hydrochloride of which melts at 251–252°, by means of the intermediate products 11-ethyl-10,11-dihydro - dibenzo[b,f]thiepin - 10 - ol, B.P. 163–165°/0.005 torr, 11 - ethyl - 10 - chloro - 10,11 - dihydro - dibenzo[b,f]thiepin, M.P. 68° (from pentane), 10 - ethyl-dibenzo[b,f]thiepin, B.P. 131°/0.015 torr, and 10-($\alpha$-bromoethyl)-dibenzo[b,f]thiepin (crude product).

To produce tablets and the like dosage units for oral application, the above-mentioned compounds according to the invention or their pharmaceutically acceptable salts are combined, e.g. with solid pulverulent carriers such as talcum, lactose, saccharose, sorbitol, mannite; starches such as potato starch, corn starch or amylopectin; cellulose derivatives or gelatin, possibly with the addition of lubricants such as magnesium or calcium stearate or polyethylene oxides of suitable molecular weights (Carbowax) and disintegrating agents such as, e.g. alginic acid, laminara powder or citrus pulp powder, to form tablets or dragée cores.

Preferred compositions according to the invention contain 10 to 50 mg. of active compound according to the invention per tablet, and consist essentially of

| | Parts by weight |
|---|---|
| Active compound | 250.0 |
| Lactose | 100.0–200.0 |
| Potato starch or corn starch | 150.0–360.0 |
| Stearate acid | 8.0–20.0 |
| Talcum | 100.0–200.0 |
| Magnesium stearate | 2.5–10.0 |
| Colloidal silicon oxide | 10.0–35.0 |
| Ethanol, q.s. | |

Compositions in the form of dragée cores according to the invention having the same content of active ingredients consist essentially of

| | Parts by weight |
|---|---|
| Active compound | 250.0 |
| Lactose | 100.0–200.0 |
| Stearic acid | 8.0–20.0 |
| Potato starch | 10.0–50.0 |
| Talcum | 60.0–200.0 |
| Magnesium stearate | 2.5–10.0 |
| Colloidal silicon oxide | 5.0–60.0 |
| Ethanol, q.s. | |

The quantum satis (q.s.) for 250 parts of active ingredient in 1000 g. of the solid of tablet or dragée core material amounts to about 90 parts by volume of ethanol.

The dragées are coated, for example, with concentrated sugar solutions which may contain for example, shellack, gum arabic, talcum and/or titanium dioxide, or with Carbowax with the addition of talcum or titanium dioxide. Dyestuffs are added to the dragées e.g. to distinguish between the different dosages. Soft gelatin capsules (pearl-shaped closed capsules) and other closed capsules consist, for example, of gelatin and contain, e.g. mixtures of the active ingredient or a suitable salt with Carbowax, and hard gelatin capsules contain, e.g. granulates of the active substance or of a suitable salt with gelatin, magnesium stearate or stearic acid. Suppositories are an example of dosage units for rectal application. They consist of a combination of the active substance or of a suitable salt with a neutral fatty base.

Ampoules for parenteral, particularly intra-muscular application, preferably contain a water soluble salt of the active substance according to the invention and suitable stabilizing agents and, optionally, buffer substances in aqueous solution. Antioxidizing agents such as sodium bisulfite, sodium sulfite, ascorbic acid or rongalite (formaldehyde-sodium bisulfite compound) are suitable in particular as stabilizing agents either alone or combined, in total concentrations between about 0.1–0.5 per mille. Because of its ability to form chelates, ascorbic acid has an additional stabilizing effect; in this function it can also be replaced by other chelating agents. The best stability of the active ingredient is attained if the pH of the ampoule solutions is between 3.5 and 5. This range can be attained, e.g. by mixtures in suitable ratio of sodium sulfite, sodium bisulfite and/or ascorbic acid, or by the addition of other buffer substances such as citric acid and/or salts thereof. In addition, the ampoules can contain a slight amount of a conventional preserving agent. The daily dosage of active substances according to the invention in the treatment of mental depression ranges from about 50 to 150 mg., for an average patient.

The following examples illustrate the production of typical forms of application for oral and for parenteral use, but the invention is in no way limited thereto.

EXAMPLE I 250 g. of 10-(dimethylamino-methyl)-dibenzo[b,]thiepin hydrochloride are mixed with 175.80 g. of lactose and 169.70 parts of potato starch, the mixture is moistened with an alcoholic solution of 10 g. of stearic acid in about 90 ml. of ethanol, and granulated through a sieve. After drying, 160 g. of potato starch, 200 g. of talcum, 2.50 g. of magnesium stearate and 32 g. of colloidal silicon dioxide are mixed therewith and the resulting mixture is pressed into 10,000 tablets each weighing 100 mg. and containing 25 mg. of the aforesaid active substance. The tablets can be marked with break lines if desired to enable a closer adaptation of the dosage to be given.

EXAMPLE II

A granulate is prepared from 250 g. of 10-(dimethylamino-methyl)-dibenzo[b,f]thiepin hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into 10,000 dragée centers. These are then coated with a concentrated syrup of 502.28 g. of crystallized saccharose, 6 g. of shellack, 10 g. of gum arabic, 0.22 g. of dyestuff and 1.5 g. of titanium dioxide and dried. The dragées obtained each weight 120 mg. and contain 25 mg. of active substance.

EXAMPLE III 1.25 g. of 10-(monomethylamino-methyl)-dibenzo[b,f]thiepin hydrochloride, 0.10 g. of ascorbic acid, 0.05 g. of sodium bisulfite and 0.10 g. of sodium sulfite are dissolved in distilled water until the volume is 100 ml. This solution is used to fill ampoules, each of preferably 2 ml. and containing 25 mg. of active substance. The ampoules are heat-sterilized in the usual way.

The active substance used in the above examples can be replaced, e.g. by the same amount of 8-methoxy-10-(dimethylamino-methyl)-dibenzo[b,f]thiepin hydrochloride, 10-($\alpha$-dimethylamino-ethyl)-dibenzo[b,f]thiepin hydrochloride or of a salt of one of the other bases embraced by Formula IA, with another of the acids given hereinbefore.

EXAMPLE IV

Manufacturing instructions for tablets containing 25 mg. of active substance:

To produce 10,000 tablets each containing 25 mg. of 10-(dimethylamino-methyl)-dibenzo[b,f]thiepin, the following components are used:

I

| | G. |
|---|---|
| The aforesaid active substance | 250.0 |
| Lactose | 175.8 |
| Potato starch | 169.7 |

II

| | |
|---|---|
| Stearic acid | 10.0 |
| Ethanol (about 90 ml.), q.s. | |

III

| | |
|---|---|
| Potato starch | 160.0 |
| Talcum | 200.0 |
| Magnesium stearate | 2.5 |
| Colloidal silicon oxide | 32.0 |
| | 1000.0 |

The substances listed under (I) are well mixed and moistened with the granulating solution (II). The granulated mass is passed through a sieve having 49–64 meshes per square centimeter. The moist granulate is then dried for about 12 hours at about 20°. The dried granulate is again passed through a sieve of the same mesh number and when intimately mixed with the substances listed under (III). The resulting mass is then pressed into tablets of 100 mg., containing 25 mg. of active substance each. Similarly, 10,000 tablets are prepared from 1000 g. of material which contains 250 g. of 10-(monomethylamino-methyl)-dibenzo[b,f]thiepin or 10-($\alpha$-monomethylamino-ethyl)-dibenzo[b,f]thiepin.

EXAMPLE V

Manufacturing instructions for the production of coated tablets (dragées) containing 25 mg. of the active substance each:

To produce 10,000 dragées each containing 25 mg. of 10-(dimethylamino-methyl)-dibenzo[b,f]thiepin, the following components are used:

A

| | G. |
|---|---|
| The aforesaid active substance | 250.0 |
| Lactose | 175.9 |

| B | G. |
|---|---|
| Stearic acid | 10.0 |
| Ethanol (about 90 ml.), q.s. | |
| C | |
| Potato starch | 20.0 |
| Talcum | 165.0 |
| Magnesium stearate | 2.5 |
| Colloidal silicon oxide | 56.6 |
| | 680.0 |

The substances listed under (A) are well mixed and moistened with the granulating solution (B). The moistened mass is granulated through a sieve having 49–64 meshes per square centimeter. The moist granulate is then dried for about 12 hours at about 20° and then passed again through a sieve of the same mesh number. The dried granulate is then intimately mixed with the substances listed under (C) and the resulting mass is compressed into cores of a weight of 68 mg. containing each 25 mg. of the aforesaid active substance. The production of the dragées is then completed in a conventional manner by applying to the cores a conventional coating solution. In this manner, dragées having each a total weight (i.e. cone plus coating) of about 100 mg. and containing 25 mg. of active substance are obtained.

Similarly, dragées are obtained by replacing the active substance used in the above example by 8-chloro-10-($\alpha$-monomethylamino-ethyl)-dibenzo[b,f]-thiepin, or 10-($\alpha$-dimethylamino-ethyl)-dibenzo[b,f]-thiepin.

EXAMPLE VI

Manufacturing instructions for the production of injection solutions containing 1.25% (weight/volume) of active substance:

To produce 50 ampoules each containing 25 mg. of 10-(dimethylamino-methyl)-dibenzo[b,f]thiepin in 2 ml. of injection solution the following components are used:

| | G. |
|---|---|
| The aforesaid active substance | 1.25 |
| Sodium bisulfite | 0.1 |
| Glycerol | 2.0 |
| Distilled water, ad 100 ml. | |

The active substance and the sodium bisulfite are dissolved in about 90 ml. of distilled water. The glycerol is then added and the volume of the preparation filled up to 100 ml. with distilled water. The solution is then filtered and filled into ampoules of 2 ml. each.

These ampoules each of which contains 25 mg. of active substance are then sterilized at 120° C. for 20 minutes.

Instead of sodium bisulfite, the same amount of cysteine can be used as an antioxidant. The preparation of injection solutions with these substances is advantageously carried out under aseptic conditions in diffuse daylight and the steam sterilization can be replaced by sterilization by filtration (as described in the "Handbook of Bacteriology" by Mackie and McCartney, p. 170, published by Livingstone Ltd., Edinburgh, Scotland (1960)).

Similarly, injection solutions are obtained by replacing the active substance used in the above example by the same amount of 10-($\alpha$-monomethylamino-ethyl)-dibenzo[b,f]thiepin.

EXAMPLE VII

Manufacturing instructions for the preparation of gelatin capsules each containing 25 mg. of active substance for rectal application.

To produce a capsule of 25 mg. of 10-(monomethyl-amino-methyl)-dibenzo[b,f]thiepin, the following are used:

| | G. |
|---|---|
| Active substance | 0.0250 |
| Butyl-hydroxy-toluene | 0.0002 |
| Paraffin (hard) | 0.0200 |
| Paraffin oil | 0.5348 |
| | 0.5800 |

The active substance and the paraffin are suspended in paraffin oil, as inert carrier, and butyl-hydroxy-toluene as antioxidant is added. The resulting liquid paste is then filled under sterile conditions into the soft gelatin capsules.

Similarly, gelatin capsules are obtained by replacing the active substance used in the above example by the same amount of 8-bromo-10-(dimethylamino-methyl)-dibenzo[b,f]thiepin or 8-chloro-10-(monomethylamino-methyl)-dibenzo[b,f]thiepin.

We claim:
1. A member selected from the group consisting of a thiepin derivative and a pharmaceutically acceptable acid addition salt, said thiepin having the formula:

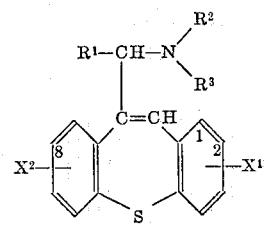

wherein each of $X^1$ and $X^2$, independently of the other is a member selected from the group consisting of hydrogen, chlorine, bromine, lower alkyl, lower alkoxy, and lower alkylthio, $R^1$ is taken from the group consisting of hydrogen and methyl, each of $R^2$ and $R^3$ taken independently is a member selected from the group consisting of hydrogen and lower alkyl, and $R^2$ and $R^3$ taken together with the nitrogen atom to which they are linked, form a saturated heterocyclic ring radical selected from the group consisting of pyrrolidinyl, piperidinyl, hexahydroazepinyl, morpholinyl, piperazinyl, homopiperazinyl and N-(hydroxy-lower alkyl)-substituted and N-alkanoyloxyalkyl substituted piperazinyl and homopiperazinyl, wherein alkyl is of from 2 to 4 carbon atoms and alkanoyloxy is of from 1 to 18 carbon atoms.

2. 10-dimethylamino-methyl-dibenzo[b,f]thiepin.
3. 10-monomethylamino-methyl-dibenzo[b,f]thiepin.
4. 2-methoxy-11-dimethylamino-methyl-dibenzo[b,f]thiepin.
5. 2-methoxy-11-monomethylamino-methyl-dibenzo[b,f]thiepin.
6. 2-chloro-10-dimethylamino-methyl-dibenzo[b,f]thiepin.
7. 2-chloro-10-monomethylamino-methyl-dibenzo[b,f]thiepin.
8. 2-methyl-10-monomethylamino-methyl-dibenzo[b,f]thiepin.
9. 2-methyl-10-dimethylamino-methyl-dibenzo[b,f]thiepin.
10. 10-($\alpha$-monomethylamino-ethyl)-dibenzo[b,f]thiepin.
11. 10-($\alpha$-dimethylamino-ethyl)-dibenzo[b,f]thiepin.
12. 8-chloro-10-(4'-methyl-piperazino)-methyl-dibenzo[b,f]thiepin.
13. 2-methylthio-11-dimethylamino-methyl-dibenzo[b,f]thiepin.

14. A compound of the formula

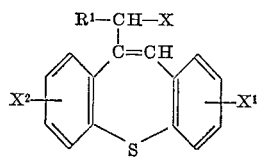

wherein each of $X^1$ and $X^2$, independently of the other, is hydrogen, chlorine, bromine, lower alkyl, lower alkoxy or lower alkylthio, $R^1$ stands for hydrogen or methyl, and X represents chlorine or bromine.
15. 10-bromomethyl-dibenzo[b,f]thiepin.
16. 10-(α-bromoethyl)-dibenzo[b,f]thiepin.
17. 2-chloro-10-bromomethyl-dibenzo[b,f]thiepin.
18. 2-chloro-11-bromomethyl-dibenzo[b,f]thiepin.
19. 2-methoxy-11-bromomethyl-dibenzo[b,f]thiepin.

References Cited

UNITED STATES PATENTS 3,100,207   8/1963   Zirkle _____ 260—268

HENRY R. JILES, *Primary Examiner.*